(12) United States Patent
Kuwahara et al.

(10) Patent No.: US 7,983,826 B2
(45) Date of Patent: Jul. 19, 2011

(54) CONTROL APPARATUS AND CONTROL METHOD FOR DRIVE SOURCE

(75) Inventors: Seiji Kuwahara, Toyota (JP); Toshiya Oishi, Toyota (JP); Shogo Matsumoto, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 107 days.

(21) Appl. No.: 12/505,870

(22) Filed: Jul. 20, 2009

(65) Prior Publication Data

US 2010/0030398 A1   Feb. 4, 2010

(30) Foreign Application Priority Data

Jul. 31, 2008 (JP) ................................ 2008-198302

(51) Int. Cl.
*B62D 127/00* (2006.01)

(52) U.S. Cl. ........................................................ 701/54

(58) Field of Classification Search ........................ 701/1
See application file for complete search history.

(56) References Cited

U.S. PATENT DOCUMENTS

| | | | | |
|---|---|---|---|---|
| 5,157,608 | A * | 10/1992 | Sankpal et al. ................. 701/58 |
| 5,305,663 | A * | 4/1994 | Leonard et al. ................ 475/123 |
| 5,413,539 | A * | 5/1995 | Leonard et al. ................ 475/63 |
| 6,358,184 | B1 * | 3/2002 | Steinmetz et al. ............. 477/143 |
| 6,790,159 | B1 * | 9/2004 | Buchanan et al. .............. 477/86 |
| 6,819,997 | B2 * | 11/2004 | Buchanan et al. .............. 701/67 |
| 7,844,382 | B2 * | 11/2010 | Ogawa ............................ 701/53 |
| 2002/0062814 | A1 * | 5/2002 | Weiss ............................ 123/320 |
| 2004/0030470 | A1 * | 2/2004 | De La Salle et al. ............ 701/22 |
| 2004/0166987 | A1 * | 8/2004 | Buchanan et al. .............. 477/70 |
| 2004/0166992 | A1 * | 8/2004 | Buchanan et al. .............. 477/181 |
| 2004/0257016 | A1 * | 12/2004 | Biester et al. .................. 318/432 |
| 2006/0142924 | A1 | 6/2006 | Nakagawa et al. |
| 2007/0043496 | A1 * | 2/2007 | Ogawa ............................ 701/53 |
| 2009/0037066 | A1 * | 2/2009 | Kuwahara et al. .............. 701/84 |
| 2009/0069971 | A1 * | 3/2009 | Asahara et al. ................. 701/29 |

FOREIGN PATENT DOCUMENTS

| | | | |
|---|---|---|---|
| DE | 19845157 A1 * | 4/2000 |
| JP | 11082090 A | 3/1999 |
| JP | 2003129876 A | 5/2003 |
| JP | 2003214231 A | 7/2003 |
| JP | 2004308649 A | 11/2004 |
| JP | 2005155410 A | 6/2005 |
| JP | 2006138265 A | 6/2006 |
| JP | 2006170079 A | 6/2006 |
| JP | 2006183506 A | 7/2006 |
| JP | 2008501095 | 1/2008 |

OTHER PUBLICATIONS

Decision to Grant Patent dated Aug. 31, 2010 in JP 2003-198302.
Notice of Grounds of Rejection dated May 11, 2010.

* cited by examiner

*Primary Examiner* — Shelley Chen
(74) *Attorney, Agent, or Firm* — Gifford, Krass, Sprinkle, Anderson & Citkowski, P.C.

(57) ABSTRACT

Static demand engine torque set in a static torque setter is converted into dynamic demand engine torque in a converter using an engine model C (s) represented by a first-order lag function. A time constant T of engine model C (s) is calculated by a time constant calculator. The time constant calculator calculates time constant T in accordance with the static demand engine torque set in the static torque setter and dynamic demand engine torque set in a dynamic torque setter. The dynamic demand engine torque set in the dynamic torque setter is added to the dynamic demand engine torque converted from the static demand engine torque in the converter.

6 Claims, 9 Drawing Sheets

STATIC DEMAND ENGINE TORQUE

ENGINE MODEL $C(s) = 1/(1+sT)$
s: COMPLEX NUMBER
T: TIME CONSTANT

DYNAMIC DEMAND ENGINE TORQUE

FIG.3

| | C1 | C2 | C3 | C4 | B1 | B2 | F |
|---|---|---|---|---|---|---|---|
| P | × | × | × | × | × | × | × |
| R1 | × | × | ○ | × | × | ○ | × |
| R2 | × | × | × | ○ | × | ○ | × |
| N | × | × | × | × | × | × | × |
| 1ST | ○ | × | × | × | × | ◎ | △ |
| 2ND | ○ | × | × | × | ○ | × | × |
| 3RD | ○ | × | ○ | × | × | × | × |
| 4TH | ○ | × | × | ○ | × | × | × |
| 5TH | ○ | ○ | × | × | × | × | × |
| 6TH | × | ○ | × | ○ | × | × | × |
| 7TH | × | ○ | ○ | × | × | × | × |
| 8TH | × | ○ | × | × | ○ | × | × |

○ ENGAGEMENT
× DISENGAGEMENT
◎ ENGAGEMENT AT THE TIME OF ENGINE BRAKING
△ ENGAGEMENT ONLY AT THE TIME OF DRIVING

CONTROL APPARATUS AND CONTROL METHOD FOR DRIVE SOURCE

This nonprovisional application is based on Japanese Patent Application No. 2008-198302 filed on Jul. 31, 2008, with the Japan Patent Office, the entire contents of which are hereby incorporated by reference.

BACKGROUND OF THE INVENTION

1. Field of the Invention

The present invention relates to a control apparatus and a control method for a drive source, and particularly to a technique for setting a demand value of an output value of a drive source and controlling the output value of the drive source in accordance with the set demand value.

2. Description of the Background Art

Conventionally, an engine in which the value of output torque or the like is determined by an opening position of a throttle valve (hereinafter, also referred to as a throttle opening position) or the like has been known. In general, the throttle opening position is actuated so as to uniquely correspond to a position of an accelerator pedal (hereinafter, also referred to as an accelerator pedal position). However, if the throttle opening position and the accelerator pedal position always uniquely correspond to each other, it is difficult to control drive force of a vehicle or the like irrespective of the intention of a driver, for example in the case where an action of the vehicle is disordered. Therefore, there is a vehicle provided with an electronic throttle valve actuated by an actuator in an engine so as to be capable of controlling the output torque and the like without depending on the accelerator pedal position. In the vehicle provided with the electronic throttle value, it is possible to set demand engine torque based on the action of the vehicle and the like in addition to the accelerator pedal position and control the engine so that actual engine torque is equal to the set demand engine torque.

For example, the demand engine torque determined in accordance with the accelerator pedal position is determined as static demand engine torque. The demand engine torque automatically determined based on the action of the vehicle and the like is determined as dynamic demand engine torque.

Here, the static demand engine torque indicates, for example, engine torque that is to be obtained when the engine is in a steady state and that is to be achieved in the future. The dynamic demand engine torque indicates engine torque that is to be obtained when the engine is in a transition state and that is to be achieved immediately.

Final demand engine torque is determined in accordance with a result of addition/subtraction or comparison between the static demand engine torque and the dynamic demand engine torque.

Japanese Patent Laying-Open No. 2003-129876 discloses selecting a larger one of a primary value of static torque and dynamic torque.

It may be desirable for engine control to achieve demand engine torque obtained, for example, by performing addition/subtraction between static demand engine torque determined in accordance with an accelerator pedal position and dynamic demand engine torque determined as the minimum torque for maintaining an idling state of the engine.

However, since the static demand engine torque and the dynamic demand engine torque have different temporal properties, that is, they are achieved at different time points, the demand engine torque cannot be obtained by simply performing addition/subtraction between the static demand engine torque and the dynamic demand engine torque. Specifically, optimal demand engine torque to be achieved at present cannot be obtained by performing addition/subtraction between demand engine torque to be achieved in the future and demand engine torque to be achieved immediately. Therefore, it is not possible to obtain demand engine torque that can be used for engine control.

Although Japanese Patent Laying-Open No. 2003-129876 describes a case where final demand engine torque is set by comparing static demand engine torque and dynamic demand engine torque, it has no description about a case where final demand engine torque is set by performing addition/subtraction between static demand engine torque and dynamic demand engine torque. Therefore, it has been impossible to set final demand engine torque by performing addition/subtraction between static demand engine torque and dynamic demand engine torque.

SUMMARY OF THE INVENTION

One object of the present invention is to control a drive source in accordance with the sum of a static demand value and a dynamic demand value.

A control apparatus for a drive source in accordance with an aspect includes: a first setter for setting a static first demand value of an output value of the drive source; a second setter for setting a dynamic second demand value of the output value; a converter for converting the first demand value into a dynamic third demand value of the output value in accordance with the first demand value and the second demand value; and a controller for controlling the drive source in accordance with a sum of the second demand value and the third demand value.

According to this configuration, a static first demand value of an output value of the drive source and a dynamic second demand value of the output value are set. The static first demand value is converted into a dynamic third demand value in accordance with the first demand value and the second demand value. Thereby, the static first demand value can be accurately converted into the dynamic third demand value in consideration of both an influence of the first demand value and an influence of the second demand value. Since the second demand value and the third demand value are both dynamic demand values, there is only a slight time lag between the time point when the second demand value is achieved and the time point when the third demand value is achieved. Accordingly, the drive source is controlled in accordance with the sum of the second demand value and the third demand value. Thereby, the drive source can be controlled in accordance with the sum of the dynamic third demand value converted from the static first demand value and the dynamic second demand value. In other words, the drive source can be controlled in accordance with the sum of the static first demand value converted into the dynamic third demand value and the dynamic second demand value. Consequently, the drive source can be controlled in accordance with the sum of a static demand value and a dynamic demand value.

Preferably, the converter converts the first demand value into the third demand value in accordance with a sum of the first demand value and the second demand value.

According to this configuration, the static first demand value is converted into the dynamic third demand value in accordance with the sum of the first demand value and the second demand value. Thereby, the static first demand value can be accurately converted into the dynamic third demand value for each demand value obtained from the first demand value and the second demand value.

More preferably, the converter converts the first demand value into the third demand value using a map having the first demand value and the second demand value as parameters.

According to this configuration, the static first demand value is converted into the dynamic third demand value using the map having the first demand value and the second demand value as parameters. Thereby, the static first demand value can be accurately converted into the dynamic third demand value for each combination of the first demand value and the second demand value.

More preferably, the output value is output torque.

According to this configuration, output torque in accordance with the sum of static demand torque and dynamic demand torque can be obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a working table of the automatic transmission.

DESCRIPTION OF THE PREFERRED EMBODIMENTS

Figure 1:
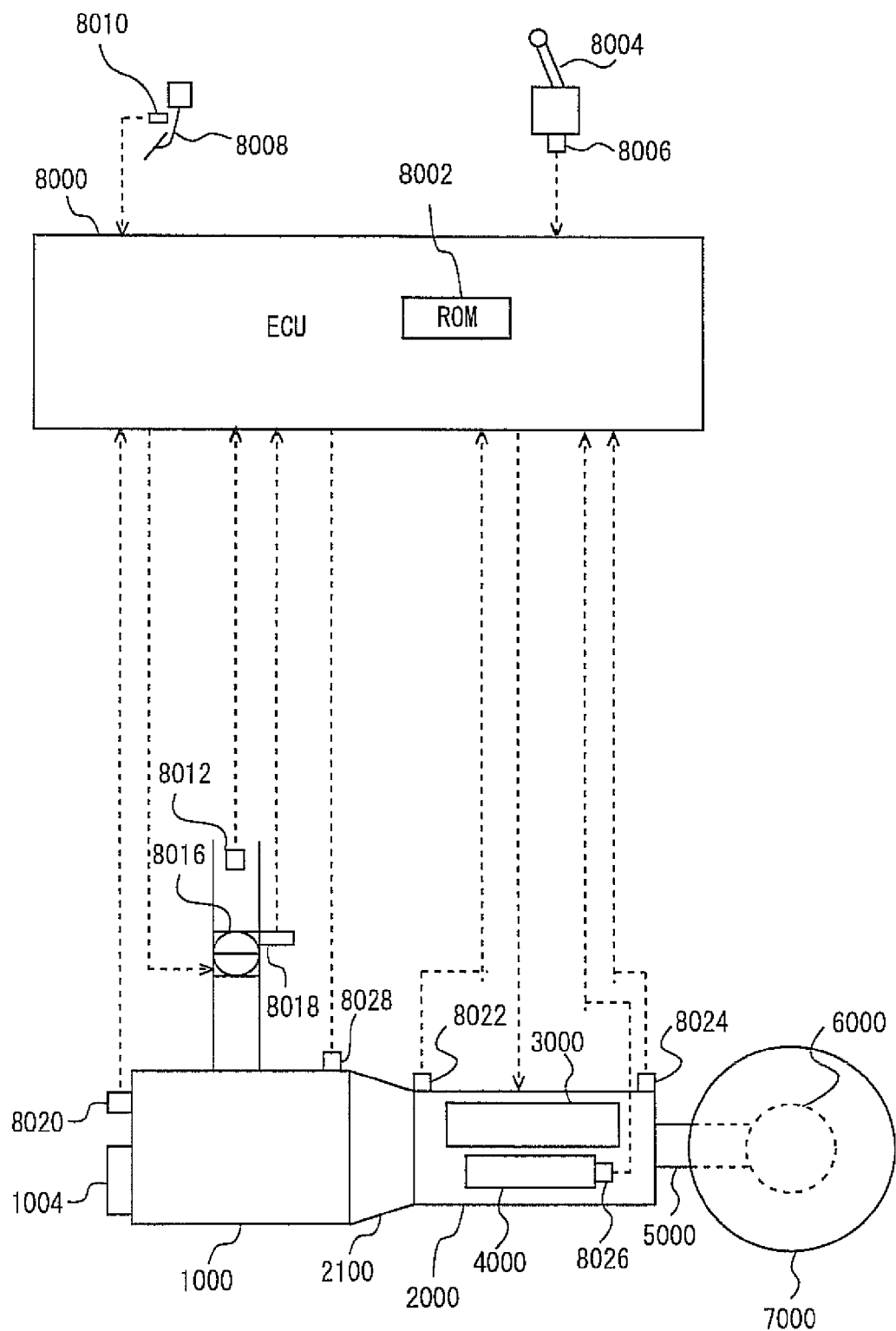
FIG. 1 is a schematic configuration diagram showing a power train of a vehicle.

Embodiments of the present invention will be described below with reference to the drawings. In the following description, the same parts are given the same reference numerals. Names and functions thereof are all the same. Therefore, a detailed description thereof will not be repeated.

First Embodiment

With reference to FIG. 1, a vehicle equipped with a control apparatus according to a first embodiment of the present invention will be described. This vehicle is an FR (Front engine Rear drive) vehicle. It should be noted that this vehicle may be a vehicle other than the FR vehicle.

The vehicle includes an engine 1000, an automatic transmission 2000, a torque converter 2100, a planetary gear unit 3000 constituting a portion of automatic transmission 2000, an oil hydraulic circuit 4000 constituting a portion of automatic transmission 2000, a propeller shaft 5000, a differential gear 6000, rear wheels 7000, and an ECU (Electronic Control Unit) 8000.

Engine 1000 is an internal combustion engine for combusting an air-fuel mixture of fuel injected from an injector (not shown) and the air in a combustion chamber of a cylinder. A piston in the cylinder is pushed down by the combustion and a crankshaft is rotated. An auxiliary machine 1004 such as an alternator and an air conditioner is driven by engine 1000. Output torque of engine 1000 (engine torque TE) is changed in accordance with an actuated amount of an electronic throttle valve 8016, that is, a throttle opening position or the like. It should be noted that a motor may be used as a drive source instead of or in addition to engine 1000. Alternatively, a diesel engine may be used. In the diesel engine, output torque is changed in accordance with the valve opening time of the injector (the actuated amount), that is, a fuel injection amount.

Automatic transmission 2000 is coupled to engine 1000 with torque converter 2100 interposed therebetween. Automatic transmission 2000 implements a desired gear so as to shift the revolution number of the crankshaft to a desired revolution number. It should be noted that a CVT (Continuously Variable Transmission) for continuously changing a gear ratio may be installed instead of the automatic transmission implementing a gear. Further, another automatic transmission configured by a constant-meshing type gear shifted by an oil hydraulic actuator or an electric motor may be installed.

Drive force output from automatic transmission 2000 is transmitted to right and left rear wheels 7000 through propeller shaft 5000 and differential gear 6000.

A position switch 8006 of a shift lever 8004, an accelerator pedal position sensor 8010 of an accelerator pedal 8008, an air flow meter 8012, a throttle opening position sensor 8018 of electronic throttle valve 8016, an engine speed sensor 8020, an input shaft speed sensor 8022, an output shaft speed sensor 8024, an oil temperature sensor 8026, and a water temperature sensor 8028 are connected to ECU 8000 with a harness and the like interposed therebetween.

A position of shift lever 8004 is detected by position switch 8006, and a signal representing a detection result is transmitted to ECU 8000. The gear of automatic transmission 2000 is automatically implemented in response to the position of shift lever 8004. Further, a configuration in which a manual shift mode that allows a driver to select any gear in accordance with the driver's manipulation may be employed.

Accelerator pedal position sensor 8010 detects a position of accelerator pedal 8008 and transmits a signal representing a detection result to ECU 8000. Air flow meter 8012 detects an amount of air to be taken in engine 1000 and transmits a signal representing a detection result to ECU 8000.

Throttle opening position sensor 8018 detects an opening position of electronic throttle valve 8016 adjusted by an actuator and transmits a signal representing a detection result to ECU 8000. The amount of air to be taken in engine 1000 is adjusted by electronic throttle valve 8016.

It should be noted that the amount of air to be taken in engine 1000 may be adjusted by a variable valve lift system changing the lift amount or opening/closing phase of an inlet valve (not shown) or an outlet valve (not shown), instead of or in addition to electronic throttle valve 8016.

Engine speed sensor 8020 detects the revolution number of an output shaft (the crankshaft) of engine 1000 (hereinafter, also referred to as engine revolution number NE) and transmits a signal representing a detection result to ECU 8000. Input shaft speed sensor 8022 detects the input shaft revolution number NI of automatic transmission 2000 (the turbine revolution number NT of torque converter 2100) and transmits a signal representing a detection result to ECU 8000. Output shaft speed sensor 8024 detects the output shaft revolution number NO of automatic transmission 2000 and transmits a signal representing a detection result to ECU 8000.

Oil temperature sensor 8026 detects a temperature (an oil temperature) of oil used for actuating and lubricating automatic transmission 2000 (ATF: Automatic Transmission Fluid) and transmits a signal representing a detection result to ECU 8000.

Water temperature sensor 8028 detects a temperature of coolant of engine 1000 (a water temperature) and transmits a signal representing a detection result to ECU 8000.

ECU 8000 controls devices so that the vehicle is in a desired traveling state based on the signals transmitted from position switch 8006, accelerator pedal position sensor 8010, air flow meter 8012, throttle opening position sensor 8018, engine speed sensor 8020, input shaft speed sensor 8022, output shaft speed sensor 8024, oil temperature sensor 8026, water temperature sensor 8028, and the like, and a map and a program stored in a ROM (Read Only Memory) 8002. It should be noted that the program to be executed by ECU 8000 may be stored in a recording medium such as a CD (Compact Disc) and a DVD (Digital Versatile Disc) and distributed in the market.

In the present embodiment, ECU 8000 controls automatic transmission 2000 so that any of first to eighth forward gears is implemented in the case where a D (drive) range is selected as a shift range of automatic transmission 2000 by placing shift lever 8004 at a D (drive) position. Since any gear among the first to eighth forward gears is implemented, automatic transmission 2000 can transmit the drive force to rear wheels 7000. It should be noted that a gear of a higher speed than the eighth gear may be implemented in the D range. A gear to be implemented is determined based on a shift map prepared beforehand by an experiment or the like taking a vehicle speed and the accelerator pedal position as parameters. It should be noted that the ECU may be divided into a plurality of ECUs.

Figure 2:
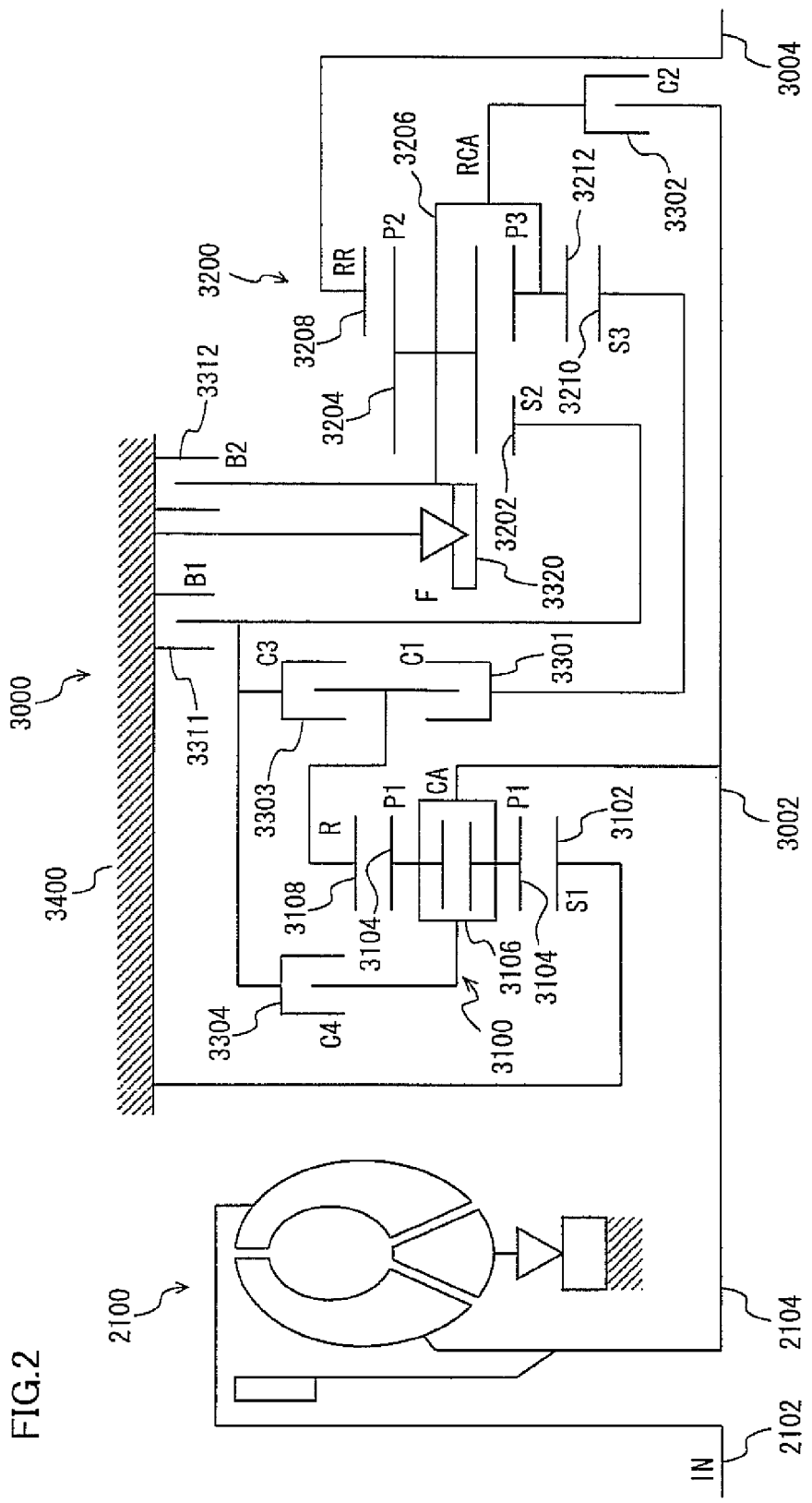
FIG. 2 is a skeleton diagram showing a planetary gear unit of an automatic transmission.

With reference to FIG. 2, planetary gear unit 3000 will be described. Planetary gear unit 3000 is connected to torque converter 2100 having an input shaft 2102 coupled to the crankshaft.

Planetary gear unit 3000 includes a front planetary 3100, a rear planetary 3200, a C1 clutch 3301, a C2 clutch 3302, a C3 clutch 3303, a C4 clutch 3304, a B1 brake 3311, a B2 brake 3312, and a one-way clutch (F) 3320.

Front planetary 3100 is a planetary gear mechanism of a double pinion type. Front planetary 3100 includes a first sun gear (S1) 3102, a pair of first pinion gears (P1) 3104, a first carrier (CA) 3106, and a first ring gear (R) 3108.

First pinion gears (P1) 3104 are meshed with first sun gear (S1) 3102 and first ring gear (R) 3108. First carrier (CA) 3106 supports first pinion gears (P1) 3104 so that first pinion gears (P1) 3104 can be rotated around an outer axis and also around their own axes.

First sun gear (S1) 3102 is fixed to a gear case 3400 so as not to rotate. First carrier (CA) 3106 is coupled to an input shaft 3002 of planetary gear unit 3000.

Rear planetary 3200 is a Ravigneaux type planetary gear mechanism. Rear planetary 3200 includes a second sun gear (S2) 3202, a second pinion gear (P2) 3204, a rear carrier (RCA) 3206, a rear ring gear (RR) 3208, a third sun gear (S3) 3210, and a third pinion gear (P3) 3212.

Second pinion gear (P2) 3204 is meshed with second sun gear (S2) 3202, rear ring gear (RR) 3208, and third pinion gear (P3) 3212. Third pinion gear (P3) 3212 is meshed with third sun gear (S3) 3210 in addition to second pinion gear (P2) 3204.

Rear carrier (RCA) 3206 supports second pinion gear (P2) 3204 and third pinion gear (P3) 3212 so that second pinion gear (P2) 3204 and third pinion gear (P3) 3212 can be rotated around an outer axis and also around their own axes. Rear carrier (RCA) 3206 is coupled to one-way clutch (F) 3320. Rear carrier (RCA) 3206 cannot be rotated when driving in the first gear (when the vehicle travels by using drive force output from engine 1000). Rear ring gear (RR) 3208 is coupled to an output shaft 3004 of planetary gear unit 3000.

One-way clutch (F) 3320 is provided in parallel to B2 brake 3312. That is, an outer race of one-way clutch (F) 3320 is fixed to gear case 3400, and an inner race thereof is coupled to rear carrier (RCA) 3206.

FIG. 3 shows a working table illustrating the relationship between the shift gears and working states of the clutches and the brakes. First to eighth forward gears and first and second reverse gears are implemented by actuating the brakes and the clutches in combinations shown in this working table.

Figure 4:
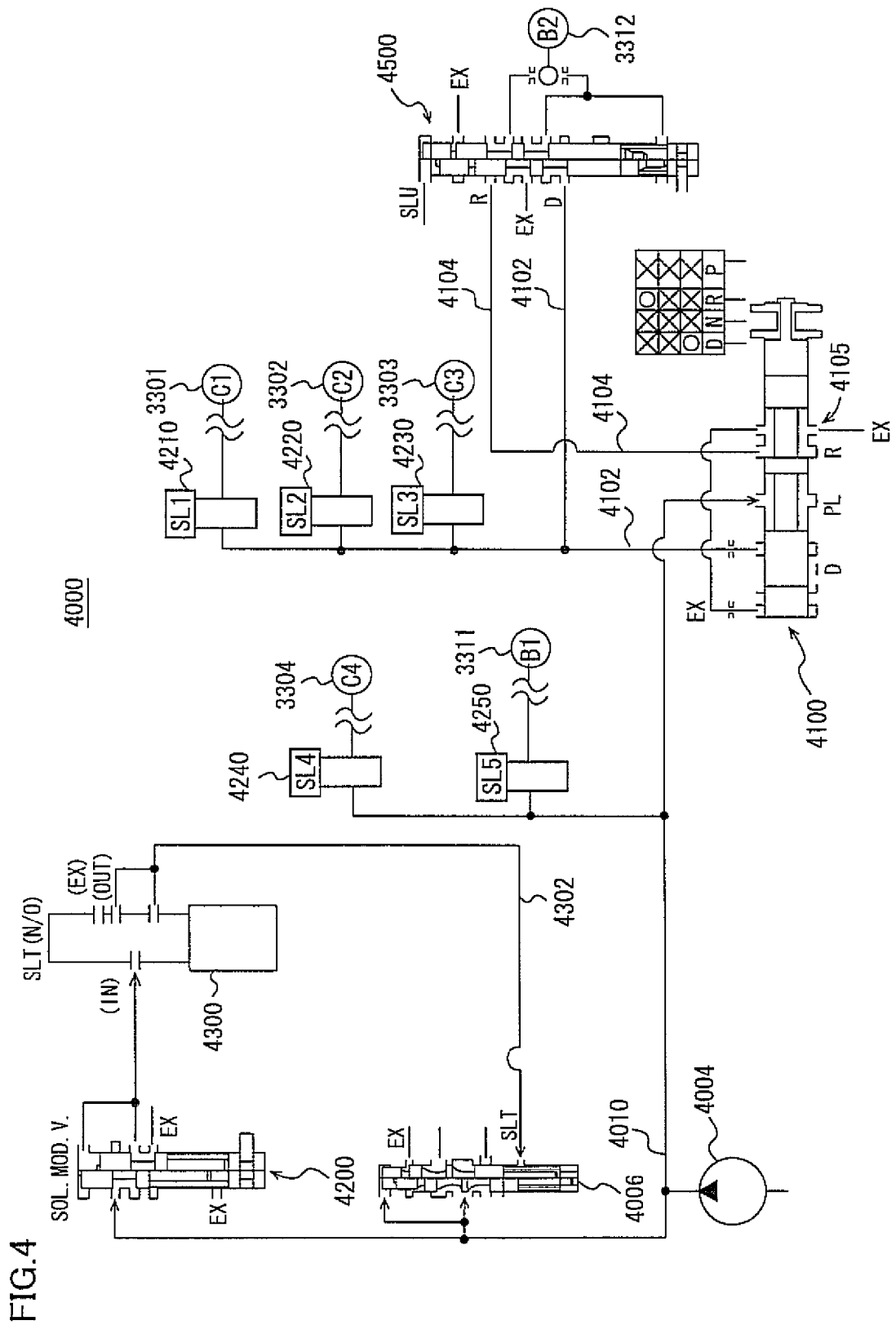
FIG. 4 is a diagram showing an oil hydraulic circuit of the automatic transmission.

With reference to FIG. 4, a principal portion of oil hydraulic circuit 4000 will be described. It should be noted that oil hydraulic circuit 4000 is not limited to the one described below.

Oil hydraulic circuit 4000 includes an oil pump 4004, a primary regulator valve 4006, a manual valve 4100, a solenoid modulator valve 4200, an SL1 linear solenoid (hereinafter, indicated as SL (1)) 4210, an SL2 linear solenoid (hereinafter, indicated as SL (2)) 4220, an SL3 linear solenoid (hereinafter, indicated as SL (3)) 4230, an SL4 linear solenoid (hereinafter, indicated as SL (4)) 4240, an SL5 linear solenoid (hereinafter, indicated as SL (5)) 4250, an SLT linear solenoid (hereinafter, indicated as SLT) 4300, and a B2 control valve 4500.

Oil pump 4004 is coupled to the crankshaft of engine 1000. Oil pump 4004 is driven by rotation of the crankshaft so as to generate oil pressure. The oil pressure generated in oil pump 4004 is regulated by primary regulator valve 4006 so as to generate line pressure.

Primary regulator valve 4006 is actuated taking throttle pressure regulated by SLT 4300 as pilot pressure. The line pressure is supplied to manual valve 4100 through a line pressure oil channel 4010.

Manual valve 4100 includes a drain port 4105. Oil pressure of a D range pressure oil channel 4102 and an R range pressure oil channel 4104 is discharged from drain port 4105. In the case where a spool of manual valve 4100 is at a D position, line pressure oil channel 4010 communicates with D range pressure oil channel 4102. Therefore, the oil pressure is supplied to D range pressure oil channel 4102. At this point, R range pressure oil channel 4104 communicates with drain port 4105. Therefore, R range pressure of R range pressure oil channel 4104 is discharged from drain port 4105.

In the case where the spool of manual valve 4100 is at an R position, line pressure oil channel 4010 communicates with R range pressure oil channel 4104. Therefore, the oil pressure is supplied to R range pressure oil channel 4104. At this point, D range pressure oil channel 4102 communicates with drain port 4105. Therefore, D range pressure of D range pressure oil channel 4102 is discharged from drain port 4105.

In the case where the spool of manual valve 4100 is at an N position, both D range pressure oil channel 4102 and R range pressure oil channel 4104 communicate with drain port 4105. Therefore, the D range pressure of D range pressure oil channel 4102 and the R range pressure of R range pressure oil channel 4104 are discharged from drain port 4105.

The oil pressure supplied to D range pressure oil channel 4102 is eventually supplied to C1 clutch 3301, C2 clutch 3302, and C3 clutch 3303. The oil pressure supplied to R range pressure oil channel 4104 is eventually supplied to B2 brake 3312.

Solenoid modulator valve 4200 regulates oil pressure to be supplied to SLT 4300 (solenoid modulator pressure) to a constant level taking the line pressure as source pressure.

SL (1) 4210 regulates oil pressure to be supplied to C1 clutch 3301. SL (2) 4220 regulates oil pressure to be supplied to C2 clutch 3302. SL (3) 4230 regulates oil pressure to be supplied to C3 clutch 3303. SL (4) 4240 regulates oil pressure to be supplied to C4 clutch 3304. SL (5) 4250 regulates oil pressure to be supplied to B1 brake 3311.

SLT 4300 regulates the solenoid modulator pressure in accordance with a control signal from ECU 8000 based on the accelerator pedal position detected by accelerator pedal position sensor 8010 so as to generate the throttle pressure. The throttle pressure is supplied to primary regulator valve 4006 through an SLT oil channel 4302. The throttle pressure is used as the pilot pressure of primary regulator valve 4006.

SL (1) 4210, SL (2) 4220, SL (3) 4230, SL (4) 4240, SL (5) 4250, and SLT 4300 are controlled by control signals sent from ECU 8000.

B2 control valve 4500 selectively supplies the oil pressure from one of D range pressure oil channel 4102 and R range pressure oil channel 4104 to B2 brake 3312. D range pressure oil channel 4102 and R range pressure oil channel 4104 are connected to B2 control valve 4500. B2 control valve 4500 is controlled by oil pressure supplied from an SLU solenoid valve (not shown) and biasing force of a spring.

In the case where the SLU solenoid valve is ON, B2 control valve 4500 attains the left side state of FIG. 4. In this case, B2 brake 3312 is supplied with oil pressure obtained by regulating the D range pressure taking the oil pressure supplied from the SLU solenoid valve as pilot pressure.

In the case where the SLU solenoid valve is OFF, B2 control valve 4500 attains the right side state of FIG. 4. In this case, B2 brake 3312 is supplied with the R range pressure.

Figure 5:
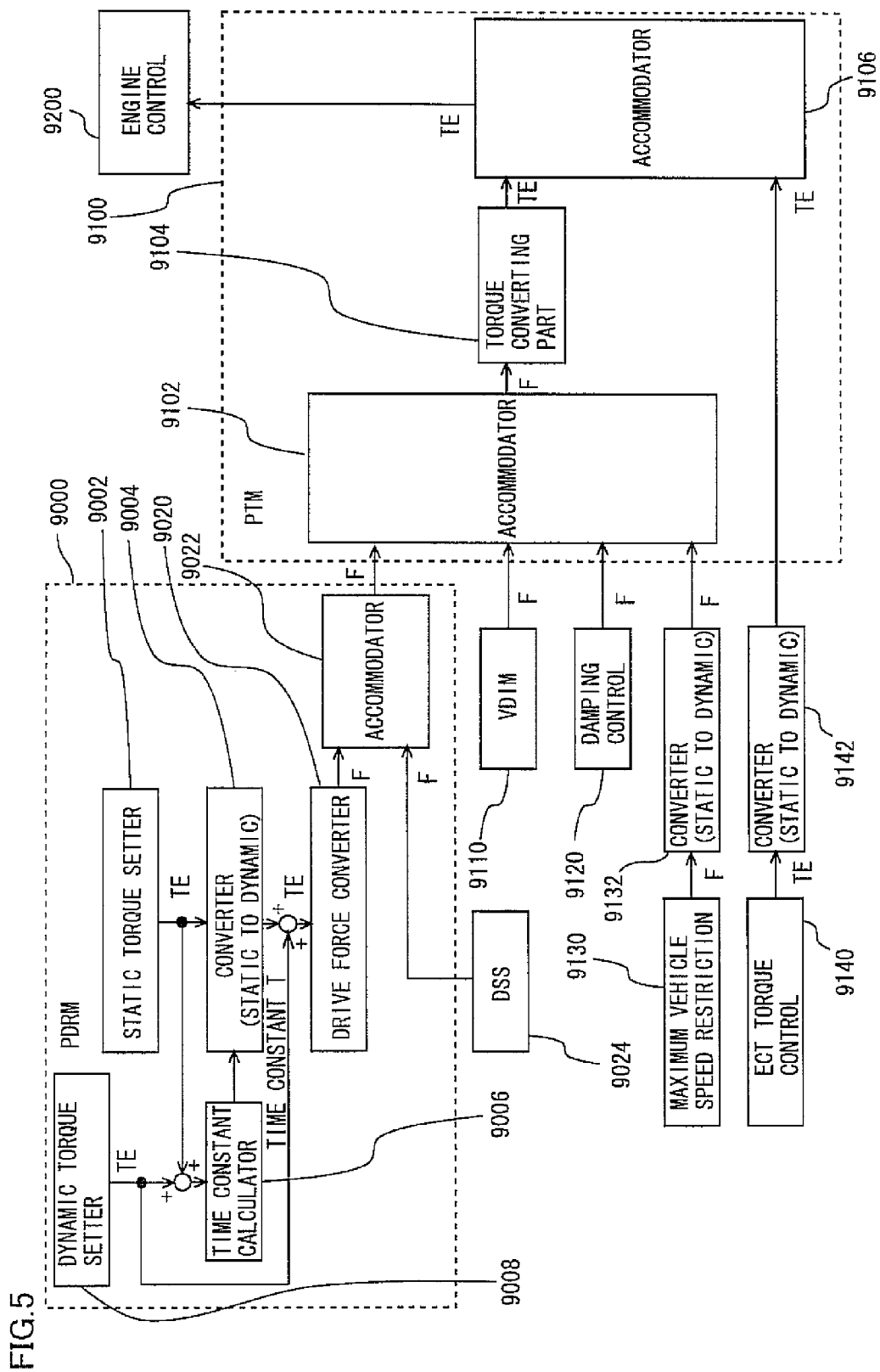
FIG. 5 is a diagram showing a system configuration of a control apparatus in a first embodiment.

With reference to FIG. 5, a system configuration of the control apparatus according to the present embodiment will be described. "F" indicates the drive force, and "TE" indicates the engine torque, in FIG. 5. It should be noted that functions of the configuration described below may be implemented by either hardware or software.

As shown in FIG. 5, the control apparatus includes a power train driver model (PDRM) 9000, a drivers support system (DSS) 9024, a power train manager (PTM) 9100, a VDIM (Vehicle Dynamics Integrated Management) system 9110, a damping control system 9120, a maximum vehicle speed restricting system 9130, an ECT (Electronic Controlled Transmission) torque controlling system 9140, and an engine controlling system 9200.

Power train driver model 9000 is a model (a function) used for setting demand drive force demanded by the driver for the vehicle based on the driver's manipulation. In the present embodiment, the demand drive force (a demand value of the drive force) is set from the accelerator pedal position according to an engine torque map predetermined based on results of experiments and simulations or the like.

Figure 6:
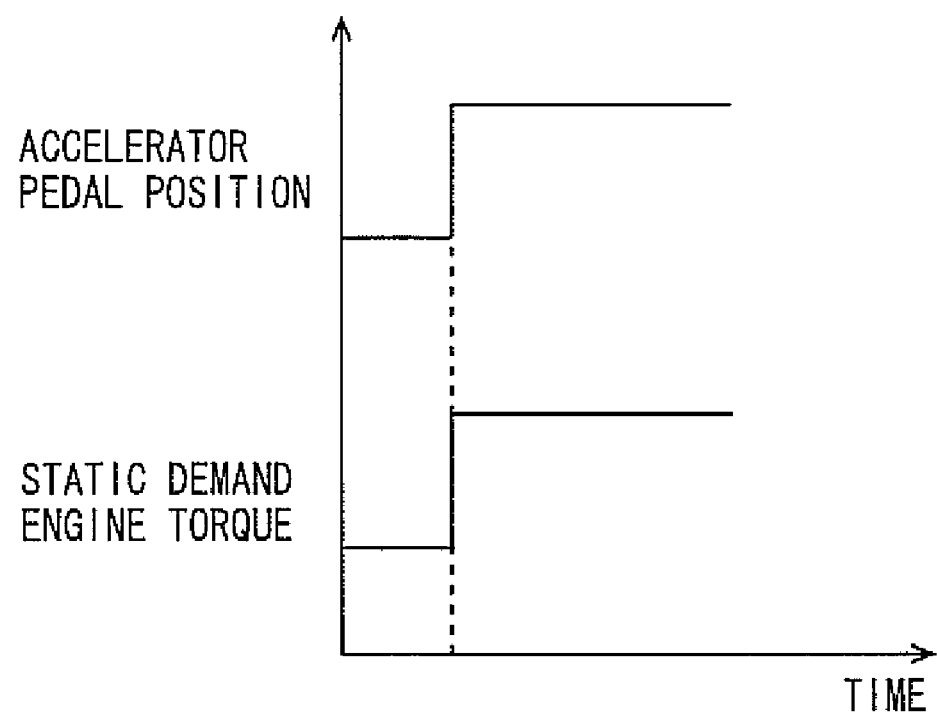
FIG. 6 is a graph showing static demand engine torque.

More specifically, static demand engine torque demanded for engine 1000 (a demand value of the output torque of engine 1000) is set from the accelerator pedal position in a static torque setter 9002. The static demand engine torque indicates demand engine torque that is to be obtained in a state where the output torque of engine 1000 is stabilized, and that is to be achieved after prescribed time has elapsed since the end of a transition state. The static demand engine torque is determined without consideration of temporal influences such as response properties of the devices including electronic throttle valve 8016 and a delay at the time of controlling as shown in FIG. 6.

The static demand engine torque set in static torque setter 9002 is converted into dynamic demand engine torque in a converter 9004. The dynamic demand engine torque indicates demand engine torque that is to be obtained in the transition state where the output torque of engine 1000 may change, and that is to be achieved immediately. The dynamic demand engine torque is determined in consideration of the temporal influences such as the response properties of the devices including electronic throttle valve 8016 and the delay at the time of controlling.

Figure 7:
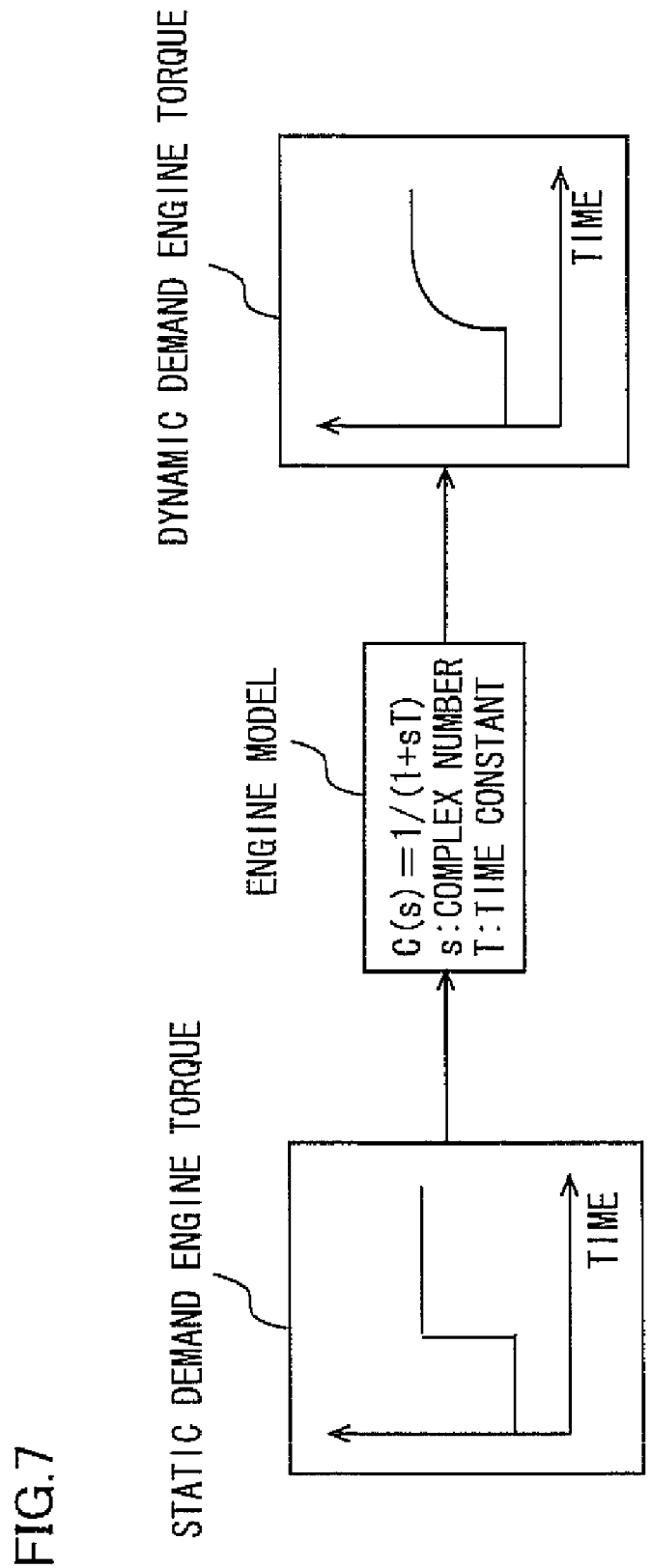
FIG. 7 is a diagram showing an engine model represented by a first-order lag function.

For example, as shown in FIG. 7, the static demand engine torque is converted into the dynamic demand engine torque by adding a delay at the time of controlling (actuating) the devices such as throttle valve 8016 using an engine model C (s) represented by a first-order lag function.

A time constant T of engine model C (s) shown in FIG. 7 is calculated by a time constant calculator 9006 shown in FIG. 5. Time constant calculator 9006 calculates time constant T in accordance with the sum of the static demand engine torque set in static torque setter 9002 and dynamic demand engine torque set in a dynamic torque setter 9008. For example, time constant T is calculated in accordance with a map having the sum of the static demand engine torque and the dynamic demand engine torque as a parameter. It should be noted that the method of calculating time constant T is not limited thereto.

By calculating time constant T in accordance with the sum of the static demand engine torque set in static torque setter 9002 and the dynamic demand engine torque set in dynamic torque setter 9008, the static demand engine torque can be accurately converted into the dynamic demand engine torque for each demand engine torque obtained from the static demand engine torque set in static torque setter 9002 and the dynamic demand engine torque set in dynamic torque setter 9008.

In the present embodiment, dynamic torque setter 9008 sets the dynamic demand engine torque corresponding to the minimum engine torque to be output by engine 1000. For example, dynamic torque setter 9008 sets the dynamic demand engine torque by ISC (Idle Speed Control). Specifically, when engine revolution number NE is higher than a predetermined target idle revolution number during idling of the engine, the demand engine torque is set to be smaller by a predetermined correction amount. Conversely, when engine revolution number NE is lower than the predetermined target idle revolution number during idling of the engine, the demand engine torque is set to be larger by the predetermined correction amount.

It should be noted that the method of setting the dynamic demand engine torque is not limited thereto. Alternatively, a throttle opening position during idling of engine 1000 may be set as in well-known ISC and dynamic demand engine torque may be calculated from the throttle opening position set by ISC.

The dynamic demand engine torque set in dynamic torque setter 9008 is added to the dynamic demand engine torque converted from the static demand engine torque in converter 9004.

Specifically, in the present embodiment, the sum of the dynamic demand engine torque converted from the static demand engine torque calculated based on the accelerator pedal position and the dynamic demand engine torque set by ISC is calculated.

In other words, the sum of the static demand engine torque calculated based on the accelerator pedal position to be converted into the dynamic demand engine torque and the dynamic demand engine torque set by ISC is calculated.

Finally obtained dynamic demand engine torque is converted into dynamic demand drive force in a drive force converter 9020. The dynamic demand drive force indicates demand drive force that is to be obtained in a transition state where the drive force of the vehicle may change, and that is to be achieved immediately. On the other hand, static demand drive force indicates demand drive force that is to be obtained in a state where the drive force of the vehicle is stabilized, and that is to be achieved after prescribed time has elapsed since the end of the transition state.

For example, the demand engine torque is converted into the demand drive force by multiplying the demand engine torque by a current gear ratio of automatic transmission 2000 and a gear ratio of differential gear 6000 and then dividing the same by a radius of rear wheels 7000. It should be noted that a generally well-known technique may be used for a method of converting the torque into the drive force. Therefore, a further detailed description will not be repeated here.

An accommodator 9022 accommodates the dynamic demand drive force converted from the dynamic demand engine torque in drive force converter 9020 and dynamic demand drive force set by drivers support system 9024. In the present embodiment, larger demand drive force of the dynamic demand drive force converted in drive force converter 9020 and the dynamic demand drive force set by drivers support system 9024 is selected and output to power train manager 9100.

Drivers support system 9024 automatically sets the dynamic demand drive force in accordance with the action of the vehicle by a cruise control system, a parking assist system, a pre-crash safety system, and the like.

Power train manager 9100 sets dynamic demand engine torque finally used for controlling engine 1000 based on dynamic demand drive forces input from power train driver model 9000, VDIM system 9110, damping control system 9120, and maximum vehicle speed restricting system 9130, and dynamic demand engine torque input from ECT torque controlling system 9140.

More specifically, an accommodator 9102 accommodates the dynamic demand drive forces input from power train driver model 9000, VDIM system 9110, damping control system 9120, and maximum vehicle speed restricting system 9130. In the present embodiment, the minimum demand drive force is selected and output to a torque converting part 9104.

The dynamic demand drive force accommodated by accommodator 9102 is converted into dynamic demand engine torque in torque converting part 9104.

An accommodator 9106 accommodates the dynamic demand engine torque converted from the demand drive force in torque converting part 9104 and the dynamic demand engine torque input from ECT torque controlling system 9140. Smaller demand engine torque or larger demand engine torque of the two demand engine torques is selected and output to engine controlling system 9200. The demand engine torque to be selected from the smaller demand engine torque and the larger demand engine torque is determined in accordance with an operation state of the vehicle or the like.

Engine controlling system 9200 controls the devices provided in engine 1000 for controlling the output torque of engine 1000 such as electronic throttle valve 8016, ignition plug, and an EGR (Exhaust Gas Recirculation) valve in order to achieve dynamic demand engine torque input from power train manager 9100.

Therefore, if engine 1000 is controlled in accordance with the dynamic demand drive force output from power train driver model 9000, engine 1000 is controlled in accordance with the sum of the static demand engine torque calculated based on the accelerator pedal position to be converted into the dynamic demand engine torque and the dynamic demand engine torque set by ISC.

VDIM system 9110 is a system for integrating VSC (Vehicle Stability Control), TRC (TRaction Control), ABS (Anti lock Brake System), EPS (Electric Power Steering), and the like. VDIM system 9110 calculates a difference between a traveling image of the driver with regard to control input for an accelerator, steering, and a brake and a vehicle action with regard to various sensor information, and controls the drive force of the vehicle, braking oil pressure, or the like so as to reduce the difference.

The VSC is control of automatically setting an optimal value of the braking oil pressure of wheels, the dynamic demand drive force of the vehicle, or the like so as to ensure stability of the vehicle in the case where a sensor detects a state in which front and rear wheels are likely to skid.

The TRC is control of automatically setting an optimal value of the braking oil pressure of the wheels, the dynamic demand drive force of the vehicle, or the like so as to ensure optimal drive force when a sensor senses slipping of drive wheels at the time of starting and accelerating the vehicle on a slippery road surface.

The ABS is a control system of automatically setting an optimal value of the braking oil pressure so as to prevent locking of the wheels. The EPS is a control system of assisting an operation of a steering wheel by force of an electric motor.

Dynamic demand drive force set in VDIM system 9110 is input to accommodator 9102 of power train manager 9100.

Damping control system 9120 sets dynamic demand drive force for reducing pitching and bouncing of the vehicle calculated from actual drive force of the vehicle or the like using a vehicle model. A conventional technique may be used for a method of setting the drive force for reducing the pitching and bouncing of the vehicle. Therefore, a further detailed description will not be repeated here.

Maximum vehicle speed restricting system 9130 sets static demand drive force for restricting the vehicle speed to be a predetermined maximum vehicle speed or lower, for example, in accordance with an acceleration, a vehicle speed, and the like at present. The static demand drive force set by maximum vehicle speed restricting system 9130 is converted into dynamic demand drive force in a converter 9132.

ECT torque controlling system 9140 sets static demand engine torque demanded for engine 1000 at the time of shifting of automatic transmission 2000. The static demand engine torque set by ECT torque controlling system 9140 is set, for example, to realize torque-down or torque-up for reducing shift shock.

The static demand engine torque set by ECT torque controlling system 9140 is converted into dynamic demand engine torque by a converter 9142.

As mentioned above, according to the control apparatus of the present embodiment, static demand engine torque based on an accelerator pedal position and dynamic demand engine torque by ISC are set. In accordance with the static demand engine torque and the dynamic demand engine torque, the static demand engine torque is converted into dynamic demand engine torque. Thereby, the static demand engine torque can be accurately converted into the dynamic demand engine torque in consideration of both an influence of the static demand engine torque and an influence of the dynamic demand engine torque. The dynamic demand engine torque set by ISC is added to the dynamic demand engine torque converted from the static demand engine torque based on the accelerator pedal position. The engine is controlled in accordance with the finally obtained demand engine torque.

Thereby, the engine can be controlled in accordance with the sum of the dynamic demand engine torque converted from the static demand engine torque calculated based on the accelerator pedal position and the dynamic demand engine torque set by ISC. In other words, the engine can be controlled in accordance with the sum of the static demand engine torque calculated based on the accelerator pedal position to be converted into the dynamic demand engine torque and the dynamic demand engine torque set by ISC.

It should be noted that a demand value of turbine torque (output torque of torque converter 2100) may be calculated, instead of that of the engine torque.

Second Embodiment

A second embodiment of the present invention will now be described. The present embodiment is different from the first embodiment described above in that a map having static demand engine torque and dynamic demand engine torque as two parameters is used to convert the static demand engine torque into dynamic demand engine torque.

Figure 8:
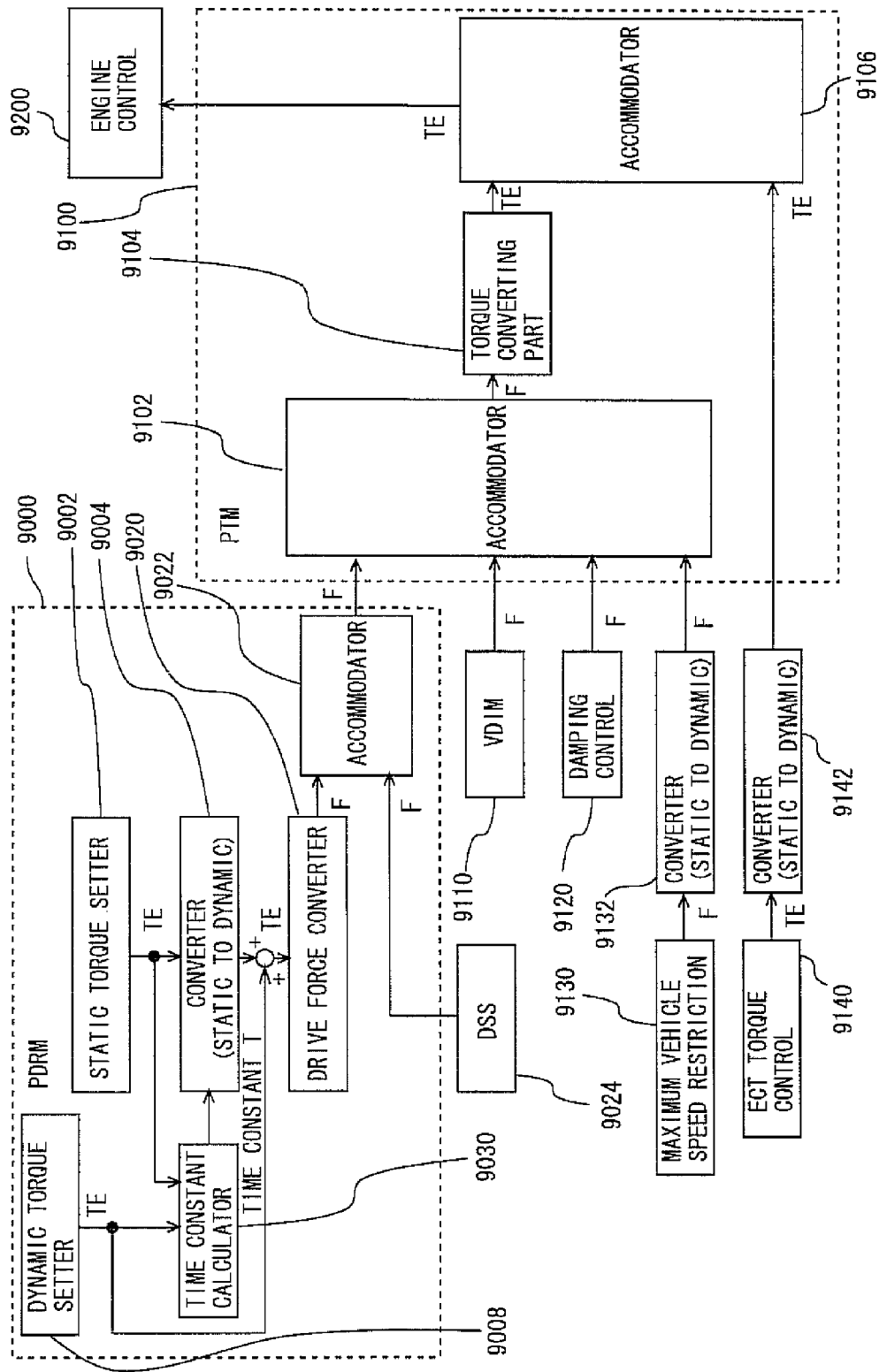
FIG. 8 is a diagram showing a system configuration of a control apparatus in a second embodiment.

With reference to FIG. 8, a time constant calculator 9030 in the present embodiment calculates time constant T of engine model C (s) in accordance with a map having static demand engine torque and dynamic demand engine torque as two parameters.

Thereby, the static demand engine torque set in static torque setter 9002 can be converted into dynamic demand engine torque using the map having the static demand engine torque and the dynamic demand engine torque as parameters.

Figure 9:
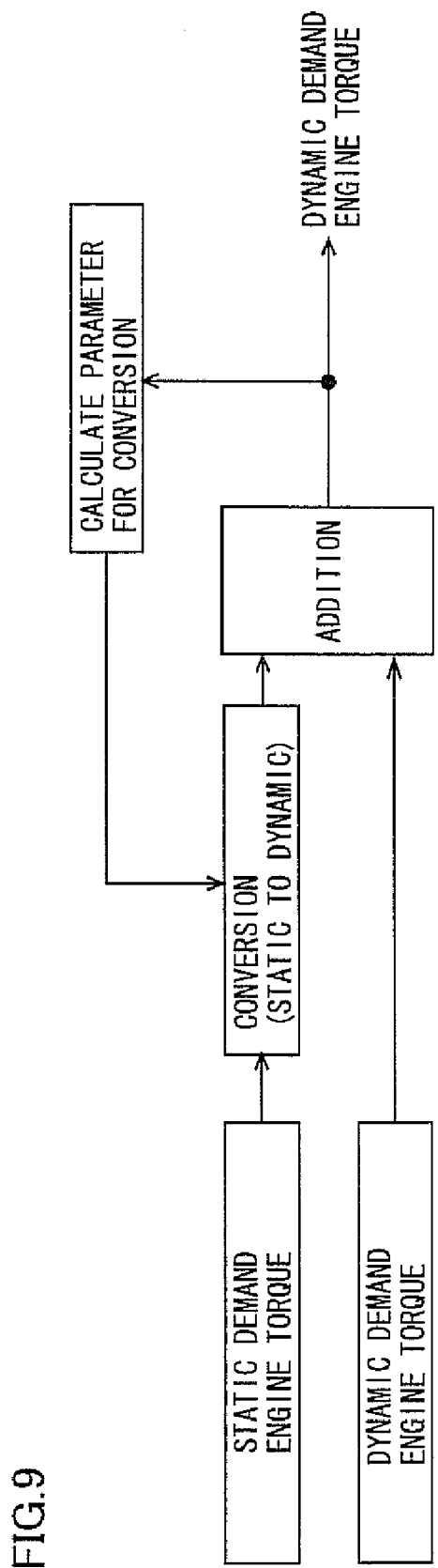
FIG. 9 is a diagram showing a concept of a convergence operation performed to prepare a map determining a time constant T.

The map used for calculating time constant T is prepared beforehand by performing a convergence operation using the static demand engine torque and the dynamic demand engine torque and calculating beforehand a parameter (time constant T) used for converting the static demand engine torque into the dynamic demand engine torque, as shown in FIG. 9.

Thereby, the static demand engine torque can be accurately converted into the dynamic demand engine torque for each combination of the static demand engine torque set in static torque setter 9002 and the dynamic demand engine torque set in dynamic torque setter 9008.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control apparatus for a drive source, comprising:
   a first setter that sets a static first demand value in accordance with an accelerator pedal position, said static first demand value being a demand value of output torque of an engine as said drive source in a steady state;
   a second setter that automatically sets a dynamic second demand value based on an action of a vehicle; said second demand value being a demand value of the output torque of said engine in a transition state;
   a converter that converts said first demand value into a dynamic third demand value of the output torque of said engine in accordance with said first demand value and said second demand value; and
   a controller that controls said engine in accordance with a sum of said second demand value and said third demand value;
   wherein said second demand value corresponds to a minimum output torque to be output by said engine for maintaining an idling state of said engine.

2. The control apparatus for the drive source according to claim 1, wherein said converter converts said first demand value into said third demand value in accordance with a sum of said first demand value and said second demand value.

3. The control apparatus for the drive source according to claim 1, wherein said converter converts said first demand value into said third demand value using a map having said first demand value and said second demand value as parameters.

4. A control apparatus for a drive source, comprising:
   means for setting a static first demand value in accordance with an accelerator pedal position, said static first demand value being a demand value of output torque of an engine as said drive source in a steady state;
   means for automatically setting a dynamic second demand value based on an action of a vehicle, said second demand value being a demand value of the output torque of said engine in a transition state;
   converting means for converting said first demand value into a dynamic third demand value of the output torque of said engine in accordance with said first demand value and said second demand value; and
   means for controlling said engine in accordance with a sum of said second demand value and said third demand value;
   wherein said second demand value corresponds to a minimum output torque to be output by said engine for maintaining an idling state of said engine.

5. The control apparatus for the drive source according to claim 4, wherein said converting means includes means for converting said first demand value into said third demand value in accordance with a sum of said first demand value and said second demand value.

6. The control apparatus for the drive source according to claim 4, wherein said converting means includes means for converting said first demand value into said third demand value using a map having said first demand value and said second demand value as parameters.

* * * * *